(12) United States Patent
Leung et al.

(10) Patent No.: US 12,316,679 B2
(45) Date of Patent: *May 27, 2025

(54) POLICY ENFORCEMENT USING HOST PROFILE

(71) Applicant: Palo Alto Networks, Inc., Santa Clara, CA (US)

(72) Inventors: Siu-Wang Leung, Las Vegas, NV (US); Song Wang, Palo Alto, CA (US); Yueh-Zen Chen, San Jose, CA (US)

(73) Assignee: Palo Alto Networks, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/116,774

(22) Filed: Mar. 2, 2023

(65) Prior Publication Data

US 2023/0388349 A1 Nov. 30, 2023

Related U.S. Application Data

(63) Continuation of application No. 16/101,105, filed on Aug. 10, 2018, now Pat. No. 11,632,396, which is a continuation of application No. 14/601,018, filed on Jan. 20, 2015, now Pat. No. 10,075,472, which is a continuation of application No. 13/115,022, filed on May 24, 2011, now Pat. No. 8,973,088.

(51) Int. Cl.
*H04L 9/40* (2022.01)

(52) U.S. Cl.
CPC ............ *H04L 63/20* (2013.01); *H04L 63/00* (2013.01); *H04L 63/02* (2013.01); *H04L 63/0272* (2013.01); *H04L 63/102* (2013.01); *H04L 63/1408* (2013.01); *H04L 63/1433* (2013.01)

(58) Field of Classification Search
None
See application file for complete search history.

(56) References Cited

U.S. PATENT DOCUMENTS

| | | |
|---|---|---|
| 6,012,100 A | 1/2000 | Frailong |
| 6,892,235 B1 | 5/2005 | Daude |
| 7,093,283 B1 | 8/2006 | Chen |
| 7,209,479 B2 | 4/2007 | Larson |
| 7,340,768 B2 | 3/2008 | Rosenberger |
| 7,673,048 B1 | 3/2010 | O'Toole, Jr. |
| 7,987,264 B1 | 7/2011 | Gill |
| 8,020,203 B2 | 9/2011 | Kumar |

(Continued)

OTHER PUBLICATIONS

Jo et al., ETRI, A Method for Security Policy Enforcement of Security Router Platform, APNOMS, 2006.

(Continued)

*Primary Examiner* — Trang T Doan
(74) *Attorney, Agent, or Firm* — Van Pelt, Yi & James LLP

(57) ABSTRACT

Embodiments of the present application relate to a method for policy enforcement, a system for policy enforcement, and a computer program product for policy enforcement. A method for policy enforcement is provided. The method includes receiving a host information profile report from a client device, and enforcing a security policy for network access based on the host information profile report. The host information profile report includes device profile information associated with the client device.

12 Claims, 17 Drawing Sheets

(56) References Cited

U.S. PATENT DOCUMENTS

| | | |
|---|---|---|
| 8,042,147 B2 | 10/2011 | Byres |
| 8,176,532 B1 | 5/2012 | Cook |
| 8,220,041 B2 | 7/2012 | Boyce |
| 8,316,435 B1 | 11/2012 | Varadhan |
| 8,370,917 B1 | 2/2013 | Hayes |
| 8,406,170 B2 | 3/2013 | Rune |
| 8,479,267 B2 | 7/2013 | Donley |
| 8,793,361 B1* | 7/2014 | Riddle .............. H04L 47/2441 |
| | | 709/224 |
| 8,842,687 B1* | 9/2014 | Jackson ............... H04L 49/557 |
| | | 370/419 |
| 8,910,241 B2 | 12/2014 | Pollutro |
| 2002/0178355 A1 | 11/2002 | D'Sa |
| 2003/0217150 A1 | 11/2003 | Roese |
| 2003/0225893 A1 | 12/2003 | Roese |
| 2003/0229808 A1 | 12/2003 | Heintz |
| 2004/0103310 A1 | 5/2004 | Sobel |
| 2004/0225895 A1 | 11/2004 | Mukherjee |
| 2006/0013191 A1 | 1/2006 | Kavanagh |
| 2006/0053290 A1 | 3/2006 | Randle |
| 2006/0053491 A1* | 3/2006 | Khuti ..................... H04L 63/20 |
| | | 709/224 |
| 2006/0075503 A1 | 4/2006 | Bunker |
| 2006/0105741 A1 | 5/2006 | Suh |
| 2006/0179031 A1 | 8/2006 | Lewis |
| 2006/0209836 A1 | 9/2006 | Ke |
| 2006/0259779 A2 | 11/2006 | Oliphant |
| 2006/0277408 A1 | 12/2006 | Bhat |
| 2007/0011733 A1 | 1/2007 | Gbadegesin |
| 2007/0143392 A1 | 6/2007 | Choe |
| 2007/0266421 A1 | 11/2007 | Vaidya |
| 2008/0022355 A1 | 1/2008 | Khosravi |
| 2008/0028456 A1 | 1/2008 | O'Rourke |
| 2008/0318657 A2 | 6/2008 | Okada |
| 2008/0196088 A1 | 8/2008 | Vinokurov |
| 2008/0244747 A1 | 10/2008 | Gleichauf |
| 2008/0247382 A1 | 10/2008 | Verma |
| 2008/0255928 A1 | 10/2008 | Tomeny |
| 2008/0282080 A1 | 11/2008 | Hyndman |
| 2008/0301765 A1 | 12/2008 | Nicol |
| 2008/0320582 A1 | 12/2008 | Chen |
| 2009/0094691 A1* | 4/2009 | Dargis ................ H04L 63/0272 |
| | | 726/11 |
| 2009/0129580 A1 | 5/2009 | Terpstra |
| 2009/0144817 A1 | 6/2009 | Kumar |
| 2009/0228974 A1 | 9/2009 | Ivanov |
| 2009/0307753 A1 | 12/2009 | Dupont |
| 2009/0328192 A1 | 12/2009 | Yang |
| 2010/0054222 A1 | 3/2010 | Rune |
| 2010/0100930 A1 | 4/2010 | King |
| 2010/0138910 A1 | 6/2010 | Aldor |
| 2010/0192196 A1 | 7/2010 | Lee |
| 2010/0242088 A1 | 9/2010 | Thomas |
| 2010/0248720 A1 | 9/2010 | Millet |
| 2010/0306816 A1 | 12/2010 | McGrew |
| 2010/0333177 A1 | 12/2010 | Donley |
| 2011/0023084 A1 | 1/2011 | Kraemer |
| 2011/0242979 A1* | 10/2011 | Feroz ..................... H04L 47/32 |
| | | 370/235 |
| 2012/0005746 A1 | 1/2012 | Wei |
| 2012/0144492 A1 | 6/2012 | Griffin |
| 2012/0198519 A1 | 8/2012 | Parla |
| 2012/0204253 A1* | 8/2012 | Sugimoto ......... H04W 36/0038 |
| | | 726/12 |
| 2012/0210417 A1 | 8/2012 | Shieh |
| 2012/0240182 A1* | 9/2012 | Narayanaswamy ........................ |
| | | H04L 63/1433 |
| | | 726/1 |
| 2012/0272293 A1 | 10/2012 | Jankowski |
| 2012/0303808 A1 | 11/2012 | Xie |

OTHER PUBLICATIONS

Muller et al., An Assisted Device Registration and Service Access System for Future Home Networks, IEEE, 2009.

\* cited by examiner

FIG. 7

```xml
<?xml version-"1.0" encoding-"UTF-8"?>
<hip-report>
        <md5-sum>a944376356b748be0cc17ae9259e63a</md5-sum>
        <user-name>sleung</user-name>
        <domain>paloaltonetwork</domain>
        <host-name>PAN00213</host-name>
        <ip-address>10.16.0.84</ip-address>
        <generate-time>03/11/2011 14:59:55</generate-time>
        <categories>
                <entry name-"host-info">
                        <client-version>1.0.1-21</client-version>
                        <os>Microsoft Windows XP Professional Service Pack 3 (build 2600)</os>
                        <os-vendor>Microsoft</os-vendor>
                        <domain>PALOALTONETWORK</domain>
                        <host-name>PAN00213</host-name>
                        <network-interface>
                                <entry name-"{CE03CC2E-A2B1-4B2C-B342-2646752O865F}">
                                        <description>PAN Virtual Ethernet Adapter - Packet Scheduler Miniport</description>
                                        <mac-address>02-50-41-00-00-01</mac-address>
                                </entry>
                                <entry name-"{FFBADD59-EC35-4D72-80F2-2D6702E462D1}">
                                        <description>PANGP Virtual Ethernet Adapter - Packet Scheduler Miniport</description>
                                        <mac-address>02-50-41-00-00-01</mac-address>
                                </entry>
                                <entry name-"{DD223117-E9AB-43E1-A511-BE58424AC924}">
                                        <description>Broadcom NetXtreme 57xx Gigabit Controller - Packet Scheduler Miniport</description>
                                        <mac-address>00-21-70-AB-2B-ED</mac-address>
                                        <ip-address>
                                                <entry name-"10.16.0.84"/>
                                        </ip-address>
                                </entry>
                                <entry name-"{2D841C37-DE51-4329-9AA6-CF8CBD0O1628}">
                                        <description>Juniper Network Connect Virtual
```

FIG. 8

```
                        Adapter</description>
                                    <mac-address>00-FF-40-C3-32-8A</mac-address>
                                </entry>
                                <entry name-"{842CF3A3-C991-432E-8E6A-7C464592D392}">
                                    <description>VMWARE Virtual Ethernet Adapter for
VMnet1</description>
                                    <mac-address>00-50-56-C0-00-01</mac-address>
                                    <ip-address>
                                        <entry name-"192.168.200.1"/>
                                    </ip-address>
                                </entry>
                                <entry name-"{7EEACAE8-B788-4D45-9115-35C7A8A91D29}">
                                    <description>VMware Virtual Ethernet Adapter for
VMnet8</description>
                                    <mac-address>00-50-56-C0-00-08</mac-address>
                                    </ip-address>
                                        <entry name-"192.168.1.1"/>
                                    </ip-address>
                                </entry>
                                <entry name-"MS TCP Loopback interface">
                                    <description>MS TCP Loopback interface</description>
                                    <mac-address>00-00-00-00-00-00</mac-address>
                                    <ip-address>
                                        <entry name-"127.0.0.1"/>
                                    </ip-address>
                                </entry>
                            </network-interface>
                        </entry>
                        <entry name-"antivirus">
                            <list/>
                        </entry>
                        <entry name-"anti-spyware">
                            <list/>
                        </entry>
                        <entry name-"disk-backup">
                            <list/>
```

FIG. 8 (Cont.)

```
</entry>
<entry name-"disk-encryption">
        <list/>
</entry>
<entry name-"firewall">
        <list>
                <entry>
                        <ProductInfo>
```

FIG. 8 (Cont.)

```xml
<?xml version="1.0" encoding="UTF-8"?>
<hip-report>
    <md5-sum>a944376356b748be0cc17ae9259e63a</md5-sum>
    <user-name>sleung</user-name>
    <domain>paloaltonetwork</domain>
    <host-name>PAN00213</host-name>
    <ip-address>10.16.0.84</ip-address>
    <generate-time>03/11/2011 14:59:55</generate-time>
    <categories>
        <entry name="host-info">
            <client-version>1.0.1-21</client-version>
            <os>Microsoft Windows XP Professional Service Pack 3 (build 2600)</os>
            <os-vendor>Microsoft</os-vendor>
            <domain>PALOALTONETWORK</domain>
            <host-name>PAN00213</host-name>
            <network-interface>
                <entry name="{CE03CC2E-A2B1-4B2C-B342-2646752O865F}">
                    <description>PAN Virtual Ethernet Adapter - Packet Scheduler Miniport</description>
                    <mac-address>02-50-41-00-00-01</mac-address>
                </entry>
                <entry name="{FFBADD59-EC35-4D72-80F2-2D6702E462D1}">
                    <description>PANGP Virtual Ethernet Adapter - Packet Scheduler Miniport</description>
                    <mac-address>02-50-41-00-00-01</mac-address>
                </entry>
                <entry name="{DD223117-E9AB-43E1-A511-BE58424AC924}">
                    <description>Broadcom NetXtreme 57xx Gigabit Controller - Packet Scheduler Miniport</description>
                    <mac-address>00-21-70-AB-2B-ED</mac-address>
                    <ip-address>
                        <entry name="10.16.0.84"/>
                    </ip-address>
                </entry>
                <entry name="{2D841C37-DE51-4329-9AA6-CF8CBD0O1628}">
                    <description>Juniper Network Connect Virtual
```

FIG. 9

```xml
            Adapter</description>
                                    <mac-address>00-FF-40-C3-32-8A</mac-address>
                                </entry>
                                <entry name-"{842CF3A3-C991-432E-8E6A-7C464592D392}">
                                    <description>VMWARE Virtual Ethernet Adapter for
            VMnet1</description>
                                    <mac-address>00-50-56-C0-00-01</mac-address>
                                    <ip-address>
                                        <entry name-"192.168.200.1"/>
                                    </ip-address>
                                </entry>
                                <entry name-"{7EEACAE8-B788-4D45-9115-35C7A8A91D29}">
                                    <description>VMware Virtual Ethernet Adapter for
            VMnet8</description>
                                    <mac-address>00-50-56-C0-00-08</mac-address>
                                    <ip-address>
                                        <entry name-"192.168.1.1"/>
                                    </ip-address>
                                </entry>
                                <entry name-"MS TCP Loopback interface">
                                    <description>MS TCP Loopback interface</description>
                                    <mac-address>00-00-00-00-00-00</mac-address>
                                    <ip-address>
                                        <entry name-"127.0.0.1"/>
                                    </ip-address>
                                </entry>
                            </network-interface>
                        </entry>
                        <entry name-"antivirus">
                            <list>
                                <entry>
                                    <ProductInfo>
                                        <Prod name-"Symantec AntiVirus" version-"10.1.7.7000" defver-"3/4/2011 rev. 2"
 prodType-"1" engver-"101.3.0.93" osType-"1" vendor-"Symantec Corp." dateday-"4" dateyear-"2011" datemon-"3">
```

FIG. 9 (Cont.)

```
                              </Prod>
                              <real-time-protection>yes</real-time-protection>
                              <last-full-scan-time>n/a</last-full-scan-time>
                         </ProductInfo>
                    </entry>
               </list>
          </entry>
          <entry name-"anti-spyware">
```

POLICY ENFORCEMENT USING HOST PROFILE

CROSS REFERENCE TO OTHER APPLICATIONS

This application is a continuation of U.S. patent application Ser. No. 16/101,105, entitled POLICY ENFORCEMENT USING HOST INFORMATION PROFILE filed Aug. 10, 2018, which is a continuation of U.S. patent application Ser. No. 14/601,018, now U.S. Pat. No. 10,075,472, entitled POLICY ENFORCEMENT USING HOST INFORMATION PROFILE, filed Jan. 20, 2015, which is a continuation of U.S. patent application Ser. No. 13/115,022, now U.S. Pat. No. 8,973,088, entitled POLICY ENFORCEMENT USING HOST INFORMATION PROFILE, filed May 24, 2011, each of which is incorporated herein by reference for all purposes.

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 7 is a screen shot illustrating a portal for policy enforcement using host profile information.

FIG. 8 is a host information profile report example in which antivirus software is not installed on a client in accordance with some embodiments.

FIG. 9 is a host information profile report example in which antivirus software is installed and enabled on a client in accordance with some embodiments.

DETAILED DESCRIPTION

Figure 1:
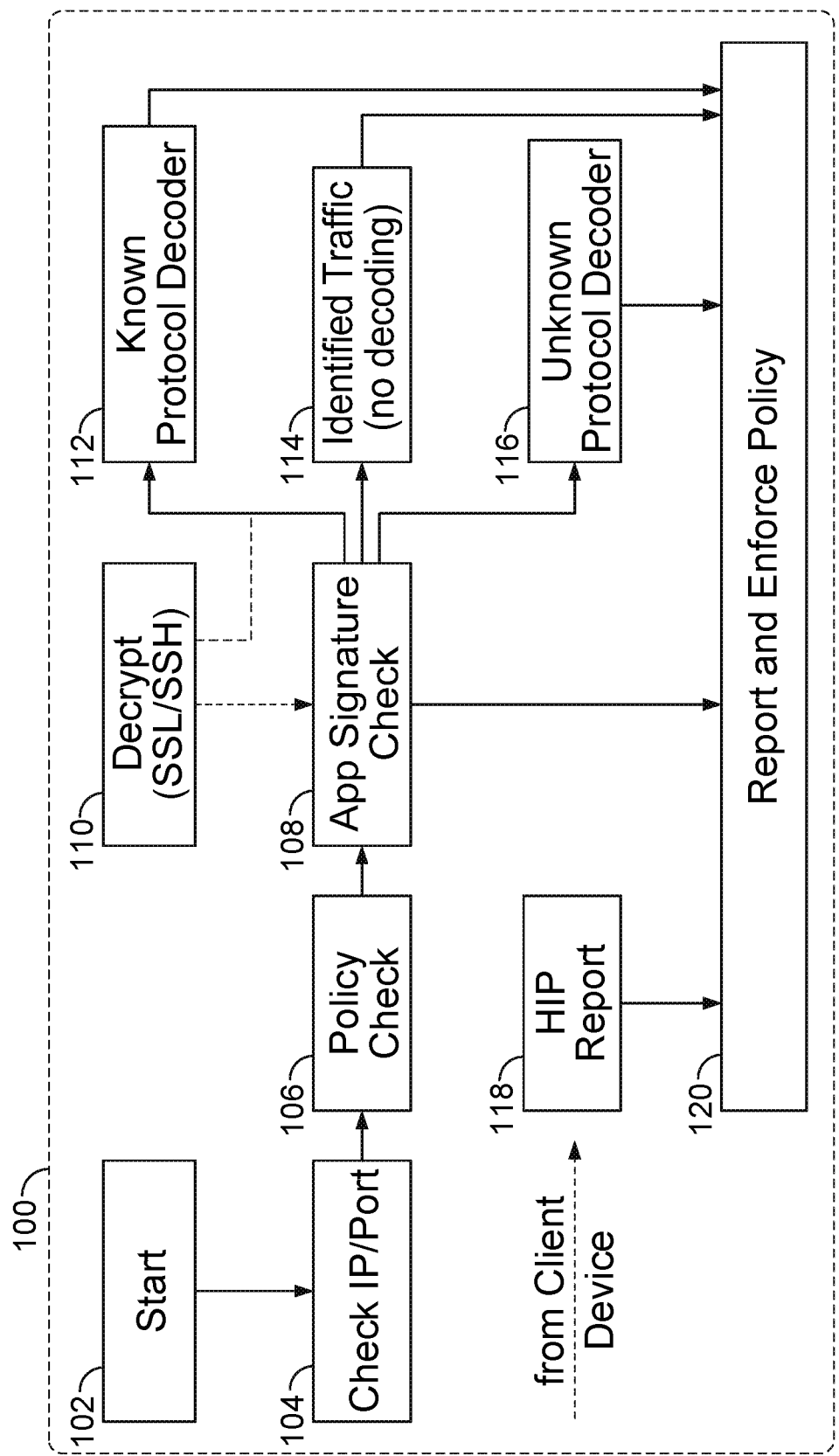
FIG. 1 is a functional diagram for policy enforcement using host profile information in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices, such as computer servers, gateways, network/routing devices (e.g., network routers), or data appliances (e.g., security appliances or other types of special purposes devices).

Firewalls typically deny or permit network transmission based on a set of rules. These sets of rules are often referred to as policies. For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). Firewalls can also be capable of performing basic routing functions.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using Hyper Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering, as discussed above. Next generation firewalls can also perform additional firewall techniques. For example, certain newer firewalls, sometimes referred to as advanced or next generation firewalls, can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, current firewalls typically enforce based on network protocol and destination port number. As a result, such firewalls generally allow any traffic that tunneled through the gateway as long as well known ports are used, such as port 80 or port 443. Also, current firewalls do not fully protect devices communicating through the firewall by determining client device specific information and enforcing policies based on the client device specific information. For example, whether or not a client device is executing up to date security software can be used as a criteria in determining whether to allow the device to access an untrusted zone (e.g., download certain types of files from a web site) or whether or not to allow the device to access certain enterprise resources (e.g., confidential enterprise information, such as a source code repository or a financial database).

What is needed to further protect devices communicating on networks is policy enforcement using host profile information, which is also referred to herein as a host information profile (HIP). In some embodiments, from the gateway/appliance side, the term host information profile (e.g., or HIP profile) refers to administration configured device profiles that can be used to match against HIP reports received from one or more client devices. For example, one HIP report can match multiple HIP profiles and, thus, a rule (e.g., a security rule, such as a firewall rule) can be determined based on one user, one application, and one or more HIP profiles. A host information profile (HIP) report is generally a report that includes various information about a device (e.g., a client device, such as a personal computer, laptop, tablet, smart phone, or any other type of network capable device). In some embodiments, from the client device side, a host information profile (HIP) report refers to data that includes information about the client device (e.g., in an XML, file or data in another format) and that is sent from the client device to a gateway (e.g., HIP information for the client device is reported to a security gateway/appliance). For example, a HIP report for a device can include information indicating the type of device, including certain hardware information (e.g., type of device, processor, network processors, and/or other hardware related information), and also generally includes certain information regarding software installed on the device (e.g., operating system and patch level, security application software and status of data files, such as for signature updates, current status information, such as the last date/time a full antivirus scan was performed, and/or current settings information, such as whether or not auto protect is enabled or disabled), and, in some cases, can also include information regarding currently executing software on the device (e.g., a list of applications executing on the device). For example, a client PC (personal computer) (e.g., or another type of client device) can send a HIP report (e.g., or its host profile information) indicating that the client PC contains the following information: all critical patches are installed; Symantec antivirus software is installed and currently executing; Windows 7 is installed and executing. From the gateway side, an administrator can configure two host information profiles (e.g., HIP profiles), such as a good-pc HIP profile and an excellent-pc HIP profile. The good-pc HIP profile definition can require that the PC client has Symantec antivirus installed and executing. The excellent-pc HIP profile definition can require that the PC client has Symantec antivirus installed and executing; Windows 7 installed and executing; and all critical patches installed. Any HIP report received by gateway can be compared with all HIP profiles to see which (if any) HIP profiles match such HIP reports. Rules (e.g., for policy enforcement and/or reporting) can be applied based on HIP profile matches along with other information (e.g., user and/or application identification, along with other information, such as protocol and source/destination port and IP address information, and perform an action, such as allow, deny, and/or report). While HIP reports have been used for security vulnerability assessment and/or remediation based on security vulnerability assessment, using HIP reports for improving next generation firewall techniques is needed.

Accordingly, policy enforcement using host profile information is disclosed. In some embodiments, policy enforcement using host profile information includes receiving a host information profile report from a client device (e.g., received directly from the client device using an agent/function executed on the client device and/or indirectly using an intermediary device/function that collects, aggregates, and/or forwards HIP reports from the client device and/or other client devices), in which the host information profile report includes device profile information associated with the client device; and enforcing a security policy for network access based on the host information profile report. For example, policy enforcement (e.g., firewall policy enforcement) can include one or more HIP profiles as a match criteria to match with HIP reports, which can allow, for example, for complex policies based on various host conditions. As another example, policy enforcement can be based on application identification, user identification, and a host information profile that matches a host information profile (HIP) report.

In some embodiments, policy enforcement using host profile information further includes determining the security policy based on a host information profile that matches the host information profile (HIP) report, an identified application, and an identified user name. For example, a gateway, a data appliance, or software executing on a device can enforce a security policy based on user name or user group, application, and host information profile (HIP) report sent from a client device. Various firewall techniques described herein can utilize a user name (e.g., an actual user name that logged into the client device), an application (e.g., the application used for/associated with the network traffic flow), and the host information profile (HIP) report (e.g., a current HIP report received from the client device) to determine if the network traffic flow should be allowed to pass through the firewall. Thus, the various firewall techniques described herein can use this additional information as criteria for rules or policies for network access/communications (e.g., firewall rules and firewall policies).

In some embodiments, in addition to using the APP-ID engine to identify the application being used (e.g., web browsing, voice over IP (VOIP), or communicating to a social networking site) and the user name associated with an IP address of the user's client device, a HIP report for the client device is also used in determining whether to allow or deny the client device traffic. In some embodiments, a HIP report is an XML file that includes information about the client device (e.g., IP address, user name, domain, security software and data file status for current signature updates, operating system (OS) type and version, OS patch level, encryption enabled status, register information, and/or other hardware or software information regarding the client device). For example, certain network access can be limited or restricted based on an application identification, a user name, and a HIP report (e.g., that matches one or more host information profiles).

In some embodiments, the security policy includes a firewall rule (e.g., inbound and/or outbound firewall rule). In some embodiments, the security policy includes a network access rule.

In some embodiments, the system includes a gateway device. In some embodiments, the system includes a security appliance. In some embodiments, the system includes a network routing device (e.g., a network router). In some embodiments, the system includes a programmed general purpose computer (e.g., a programmed computer, laptop, tablet, or smart phone, or another type of a network capable device with a general purpose processor that can execute security software).

In some embodiments, the host information profile report includes device hardware information. In some embodiments, the host information profile report includes device software information. In some embodiments, the host information profile report includes device software information, in which the device software information includes an operating system identifier, an operating system patch level, and security applications and security data file levels. In some embodiments, the host information profile report includes device software information, in which the device software information includes remediation information. In some embodiments, the host information profile report includes device software information, in which the device software information includes information identifying applications executing on the client device. In some embodiments, the host information profile report includes device location information, in which the device location information includes information for identifying whether the client device is in a trusted zone or an untrusted zone. In some embodiments, the host information profile report includes device authorization information, in which the device authorization information includes information for identifying whether the client device is authorized for access to a corporate network. Similarly, administrators (e.g., network or security administrators) can configure host information profiles based on any or all of the above information/criteria that can be included in host information profile reports.

In some embodiments, the host information profile report is generated by an agent executed on the client device, and in which the host information profile report is periodically reported from the client device.

In some embodiments, policy enforcement using host profile information includes matching the host information profile report from the client device with one or more host information profiles, in which the one or more host information profiles are configured by an administrator. In some embodiments, policy enforcement using host profile information includes determining the security policy based on a host information profile that matches the host information (HIP) profile report, and an identified application. In some embodiments, policy enforcement using host profile information includes determining the security policy based on a host information profile that matches the host information profile (HIP) report, and an identified user name. In some embodiments, policy enforcement using host profile information includes determining the security policy based on a host information profile that matches the host information profile (HIP) report, an identified application, and an identified user name.

In some embodiments, policy enforcement using host profile information includes receiving host information profile reports from each of a plurality of client devices.

In some embodiments, policy enforcement using host profile information includes denying access permission to a corporate resource (e.g., confidential enterprise information, such as a source code repository or a financial database) based on the host information profile report, in which the host information profile report indicates that the client device is a potentially insecure host.

In some embodiments, a gateway for policy enforcement using host profile information includes establishing a secure connection between the gateway and a client device, in which the client device is located outside of an enterprise secured network, and in which the gateway is an enterprise gateway that is located within the enterprise secured network; receiving a host information profile report for the client device, in which the host information profile report includes device profile information associated with the client device; and enforcing a security policy for network access based on the host information profile report.

FIG. 1 is a functional diagram for policy enforcement using host profile information in accordance with some embodiments. As shown in FIG. 1, network traffic is monitored at a firewall 100. In some embodiments, network traffic is monitored using a data appliance (e.g., a data appliance that includes security functions, such as a security appliance that includes a firewall). In some embodiments, network traffic is monitored using a gateway (e.g., a gateway that includes security functions, such as a security gateway). In some embodiments, network traffic is monitored using a host (e.g., security software executed on a host device, such as a network server or client computing device, such as a personal computer, laptop, tablet, or smart phone). In some embodiments, the network traffic is monitored using in-line monitoring techniques. In some embodiments, the network traffic is collected and/or monitored (e.g., some of the network traffic can be monitored using in-line monitoring techniques and/or some of the network traffic can be collected and analyzed for monitoring the network traffic offline, such as in logs of network traffic).

In some embodiments, network traffic is monitored using a state-based firewall. In some embodiments, the state-based firewall can monitor traffic flows using APP-ID engine (e.g., App Signature Check & User ID Check 108). For example, the monitored network traffic can include HTTP traffic, FTP traffic, DNS requests, unclassified application traffic (e.g., unknown application traffic), and/or other types of traffic (e.g., traffic using other types of known or unknown protocols).

As shown in FIG. 1, network traffic monitoring begins at 102. At 104, an IP address and port engine determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. An application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, FTP traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using SSL, SSH, or another known encryption protocol), then the monitored traffic can be decrypted using a decrypt engine 110. A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

As also shown in FIG. 1, a HIP report 118 is provided from the client device. For example, HIP reports from client devices can be provided (e.g., pushed, pulled, or collected) periodically, based upon an event, and/or in response to a request. The results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and HIP reports (e.g., matching one or more host information profiles), as described herein with respect to various embodiments. In some embodiments, report and enforce policies engine 120 determines whether a current HIP report for a client matches one or more host information profiles (e.g., configured by a network or security administrator) to determine whether one or more enforcement rules and/or reporting rules should be applied to client's monitored network traffic flow(s).

In some embodiments, firewall 100 also includes a content-ID engine (not shown), and, in some embodiments, the content-ID engine's identified content is also used by report and enforce policy engine 120, possibly in various combinations with other information, such as application, user, and HIP report (e.g., that matches one or more host information profiles), to enforce various security/firewall policies/rules.

In some embodiments, various other functional architectures and flows are provided to implement the policy enforcement using host information profile techniques described herein. For example, some of these functions can be implemented in software executed on a general processor and/or some of these functions can be implemented using hardware acceleration techniques for faster packet processing of network traffic.

Figure 2:
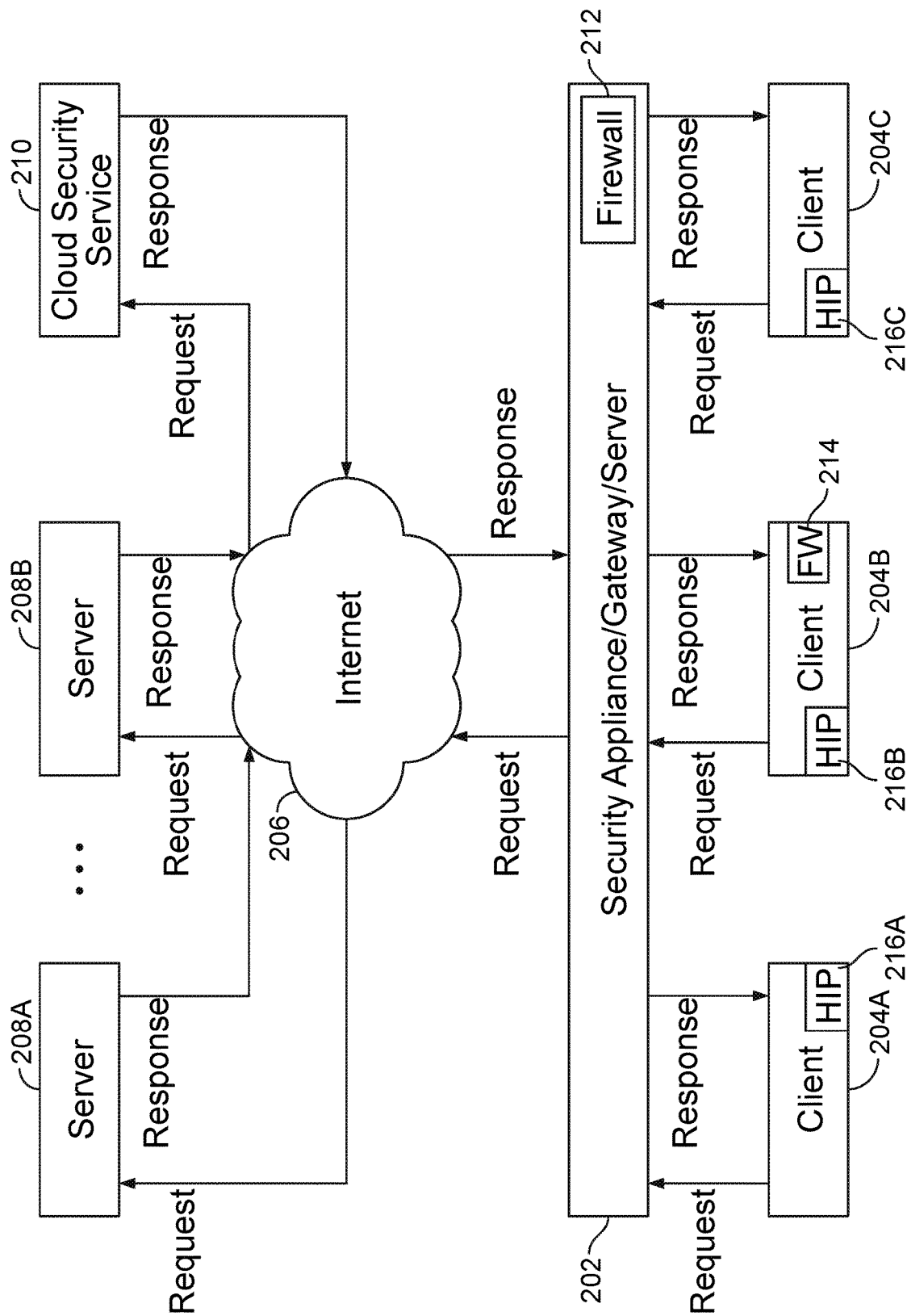
FIG. 2 is a block diagram illustrating an architecture for policy enforcement using host profile information in accordance with some embodiments.

FIG. 2 is a block diagram illustrating an architecture for policy enforcement using host profile information in accordance with some embodiments. As shown in FIG. 2, client devices 204A, 204B, and 204C are in communication with the Internet 206 via a security device 202. In some embodiments, the security device 202 includes a firewall 212, as shown. In some embodiments, one or more of the client devices 204A-204C includes a firewall 214 (e.g., host based firewall), as shown. In some embodiments, the security device 202 includes a data appliance (e.g., a security appliance), a gateway (e.g., a security server), a server (e.g., a server that executes security software including firewall 212), and/or some other security device, which, for example, can be implemented using computing hardware, software, or various combinations thereof. In some embodiments, firewall 212 and/or firewall 214 perform some or all of the functions described above with respect to FIG. 1. For example, client devices 204A-C can include various computing devices that can access the Internet via wired and/or wireless communications, such as computers, laptops, tablets, smart phones, and/or various other types of computing devices with network communication capabilities. As also shown, servers 208A and 208B are in communication with the Internet. For example, a client device can access a service provided by a server via the Internet, such as a web related service (e.g., web site, cloud-based services, streaming services, or email service), peer-to-peer related service (e.g., file sharing), IRC service (e.g., chat service), and/or any other service that can be delivered via the Internet.

In some embodiments, the security device 202 implements various network security functions including policy enforcement using host information profile techniques as described herein with respect to various embodiments. In some embodiments, the various network security functions for policy enforcement using host profile information as described herein with respect to various embodiments are implemented in part in security device 202 and in part in each of the client devices (e.g., client 204B using firewall 214). In some embodiments, the various network security functions for policy enforcement using host information profile techniques as described herein with respect to various embodiments are implemented in part in security device 202 and in part using a cloud-based security service 210 accessible via the Internet 206 (e.g., using secure communications), as further described herein with respect to various embodiments. In some embodiments, the various network security functions for policy enforcement using host information profile techniques as described herein with respect to various embodiments are implemented in part in security device 202, in part using a cloud-based security service accessible via the Internet (e.g., using secure communications), and in part in each of the client devices. In some embodiments, the various network security functions for policy enforcement using host information profile techniques as described herein with respect to various embodiments are implemented in each of the client devices (e.g., implemented as security software executed on each client device and/or in client device hardware, such as a general processor and/or modem processor). In some embodiments, the various network security functions for policy enforcement using host information profile techniques as described herein with respect to various embodiments are implemented in part in each of the client devices and in part using a cloud-based security service accessible via the Internet (e.g., using secure communications).

For example, the security device 202 (e.g., an integrated security appliance/gateway/server) can communicate with security cloud service 210 (e.g., using secure communications, such as encrypted communication techniques) to receive security related content updates (e.g., signatures, heuristics, HIP related information, application ID related information, user ID related information, content ID related information, trusted/untrusted zone information, and/or policy/rules). As another example, the security device 202 (e.g., an integrated security appliance/gateway/server) can communicate with security cloud service 210 (e.g., using secure communications, such as encrypted communication techniques) to provide the monitored traffic information (e.g., and/or subsets of such monitored traffic information, such as a portion of the packet flow, monitored URL/DNS information, monitored files requested for upload/download/access, and/or other information, along with HIP report information for the client device associated with the traffic flow and possibly user identification and/or application identification information as well), and the security cloud service 210 can perform additional analysis (e.g., additional heuristic or security research analysis and/or compare to other samples received and analyzed for other customers of the security cloud service). As will now be apparent, some or all of the functions described above with respect to FIG. 1 can be assisted by or implemented in whole or in part by the security cloud service. The security cloud service can allow for reducing the processing on the client device (e.g., 204B) and/or security device 202 by performing some of these functions. The security cloud service can also provide additional heuristic based analysis and/or use additional information by having received many more network traffic flows of information (e.g., including network traffic behaviors and/or URLs) and can aggregate such information to provide for more information for certain application traffic flows and/or URLs that may not (yet) be known by the security device 202.

As also shown in FIG. 2, each of the clients 204A-204C includes a client device agent for providing HIP reports, shown as HIP agents 216A-216C, respectively. In some embodiments, the HIP agent uses standard techniques to call an API from each hardware/software OS/application vendor (e.g., OPSWAT API for collecting HIP information) that allows for secure querying of hardware/software information of client devices. In some embodiments, such techniques indicate whether certain security software is installed, status of the data/signature file version/date for the security software, whether the security software is installed and executing, and/or certain feature settings, such as whether auto protect for antivirus software is enabled. In some embodiments, HIP agents are provided for various client device OS platforms, such as Microsoft Windows®, Apple MAC® OS, Apple iOS®, Linux OS, and/or various other platforms for computers, laptops, tablets, smart phones, and/or other client devices.

In some embodiments, HIP reports from client devices are automatically pushed to the gateway (e.g., a push model). In some embodiments, the gateway requests the HIP reports from the clients (e.g., a pull model). In some embodiments, HIP reporting is performed using various combinations of push and pull model related reporting techniques. In some embodiments, the HIP reporting from the clients to the gateway can be implemented using a pull model or polling from the gateway to the client devices. In some embodiments, agents on client devices report new or updated HIP reports to the gateway (e.g., data appliance or security appliance) that it has a new or updated HIP report by sending a HIP check message to the gateway. For example, the HIP check message can be sent to the gateway periodically (e.g., about once per hour) or upon a change to the HIP report information. The gateway can respond to the HIP check message by indicating whether the new or updated HIP report should be sent to the gateway.

In some embodiments, the HIP agent, which provides for HIP collection and reporting, gets pushed to the client device. In some embodiments, the HIP agent is installed on the client device (e.g., corporate IT or service provider can include an approved or standard HIP agent in a corporate software stack that is installed on all corporate approved devices). In some embodiments, client devices are redirected when attempting to access the network (e.g., external web site) to a portal that requires users to download the HIP agent or automatically pushes the HIP agent to the client device. Various other techniques can be used to ensure that an appropriate HIP agent is properly installed and executing on the client device as a prerequisite for network access. In some embodiments, traffic is blocked and redirected to the portal (e.g., the portal can provide instructions/information for the requirement for installing the appropriate HIP agent for network access and/or provide access for downloading such a HIP agent) until the client device includes a properly installed and executing the HIP agent.

In some embodiments, the client device agent sends a user name, a host address, and a host information profile (HIP) report (e.g., or a HIP check message, which can be sent periodically or at a fixed time interval, such as once per hour) to report the status of the client device to the gateway to allow the gateway to determine if the client traffic should be allowed or denied. In some embodiments, the gateway uses the application (e.g., identified using the APP-ID engine, which can use signature-based packet detection and/or heuristics-based detection), the user name (e.g., identified using the User-ID engine, which can extract the user name information using a client agent to extract login information, such as using single sign-on in Microsoft Windows® and/or other user identification techniques), and the HIP report (e.g., received from the GlobalProtect agent or another trusted agent executed on the client device) to determine which security rule (e.g., firewall rule and/or firewall policy) the client traffic matches to determine whether to allow or deny the client traffic. In some embodiments, the HIP report includes information indicating processes/applications executing on the client, different rules/policies can be applied based on this additional information. In some embodiments, the HIP report can include information that allows the gateway to determine if the user is using an authorized corporate/enterprise client device or using an unauthorized client device (e.g., personal home computer, personal table, or personal smart phone) and to apply different security rules/policies accordingly.

In some embodiments, different security policies or different security rules are applied based on HIP information as well as based on zone information, such as trusted and untrusted zones. For example, location information, such as whether the client device is inside or outside of the firewall or inside or outside of the enterprise network can be used to determine whether the client device is in a trusted zone or untrusted zone. Also, whether the client device is using inside trusted ports or outside untrusted ports, whether the client device is tunneling into the enterprise network using a secure VPN from home/offsite location into an enterprise computer using a secure enterprise gateway, and/or various other criteria can be used to determine whether or not the client device is operating in a trusted or untrusted zone.

In some embodiments, security policies/rules are applied based on determinations of external users entering the enterprise network (e.g., corporate network, university network, government network, or another type of enterprise's private access network) from outside the office (e.g., zone based policies, in which the user is entering from an untrusted zone and trusted zones). In some embodiments, security policies/rules are applied based on determinations of enterprises' users using the enterprise network from inside the enterprise to access external network resources, such as web sites (e.g., from a trusted zone to a potentially untrusted zone).

Figure 3:
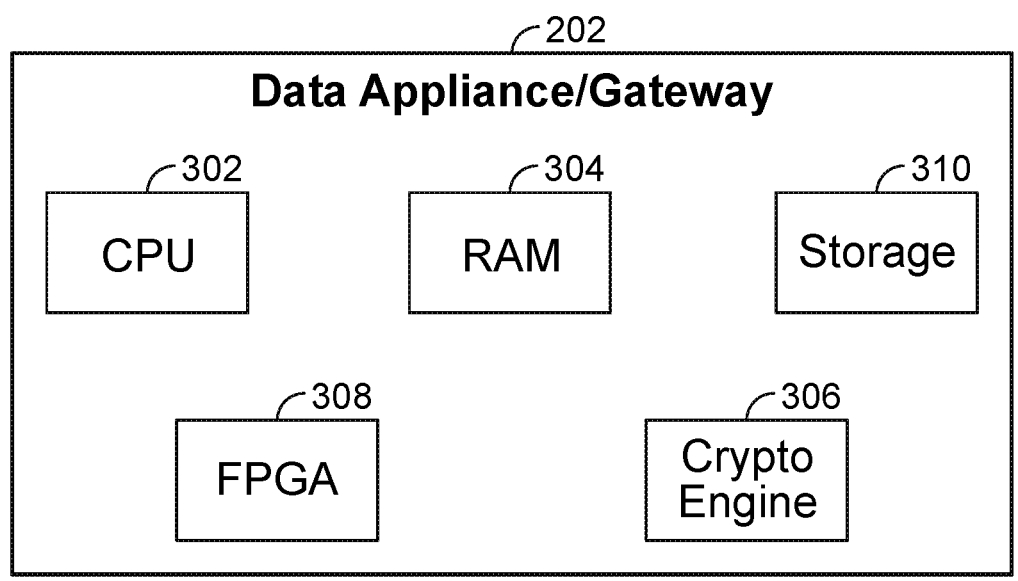
FIG. 3 is a functional diagram of hardware components of a data appliance for policy enforcement using host profile information in accordance with some embodiments.

FIG. 3 is a functional diagram of hardware components of a data appliance for policy enforcement using host profile information in accordance with some embodiments. The example shown is a representation of physical components that can be included in data appliance 202 (e.g., a data appliance or gateway). Specifically, data appliance 202 includes a high performance multi-core CPU 302 and RAM 304. Data appliance 202 also includes a storage 310 (e.g., one or more hard disks or solid state storage units), which is used to store policy and other configuration information as well as HIP reports. Data appliance 202 can also include one or more optional hardware accelerators. For example, data appliance 202 can include a cryptographic engine 306 configured to perform encryption and decryption operations, and one or more FPGAs 308 configured to perform signature matching, act as network processors, and/or perform other tasks.

Figure 4:
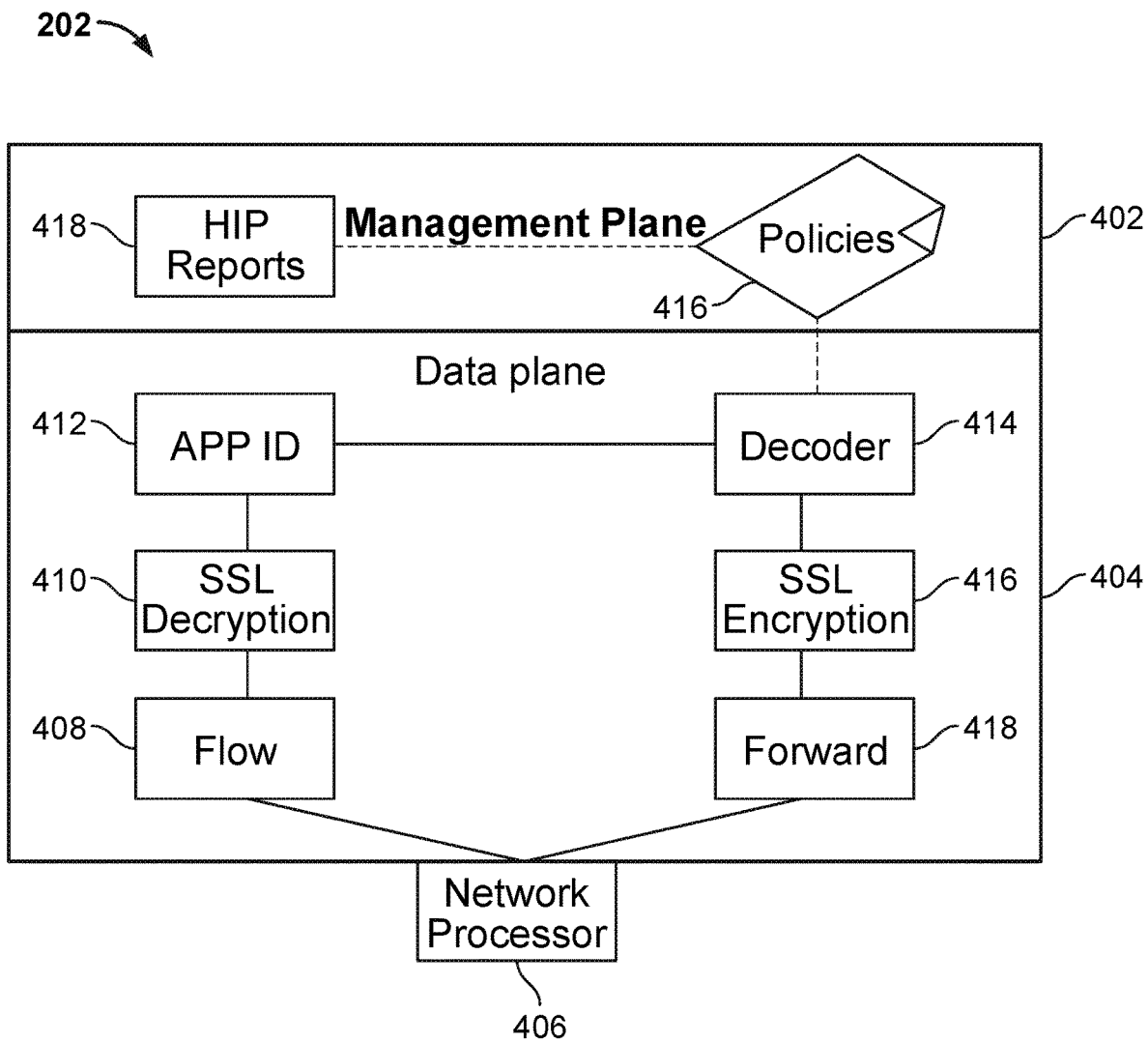
FIG. 4 is a functional diagram of logical components of a data appliance for policy enforcement using host profile information in accordance with some embodiments.

FIG. 4 is a functional diagram of logical components of a data appliance for policy enforcement using host profile information in accordance with some embodiments. The example shown is a representation of logical components that can be included in data appliance 202. As shown, data appliance 202 includes a management plane 403 and a data plane 404. In some embodiments, the management plane is responsible for managing user interactions, such as by providing a user interface for configuring policies and viewing log data. The data plane is responsible for managing data, such as by performing packet processing and session handling.

Suppose a client 204A attempts to access a server 208B using an encrypted session protocol, such as SSL. Network processor 406 is configured to receive packets from client 204A, and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decrypter 410. Otherwise, processing by SSL decrypter 410 is omitted. application identification module 412 is configured to determine what type of traffic the session involves and to identify a user associated with the traffic flow. For example, application identification module 412 can recognize a GET request in the received data and conclude that the session requires an HTTP decoder. For each type of protocol, there exists a corresponding decoder 414. In some embodiments, the application identification is performed by an application identification module (e.g., APP-ID engine), and a user identification is performed by another function/engine. Based on the determination made by application identification module 412, the packets are sent to an appropriate decoder 414. Decoder 414 is configured to assemble packets (e.g., which may be received out of order) into the correct order, perform tokenization, and extract out information. Decoder 414 also performs signature matching to determine what should happen to the packet. As also shown, HIP reports 418 for client devices are received and stored in the management plane 402. In some embodiments, policy enforcement using host profile information is applied as described herein with respect to various embodiments based on the monitored, identified, and decoded session traffic flows. In some embodiments, decoder 414 can also enforce policies 416 provided by management plane 402, including those applicable based on policy enforcement using host profile information as described herein.

Figure 5:
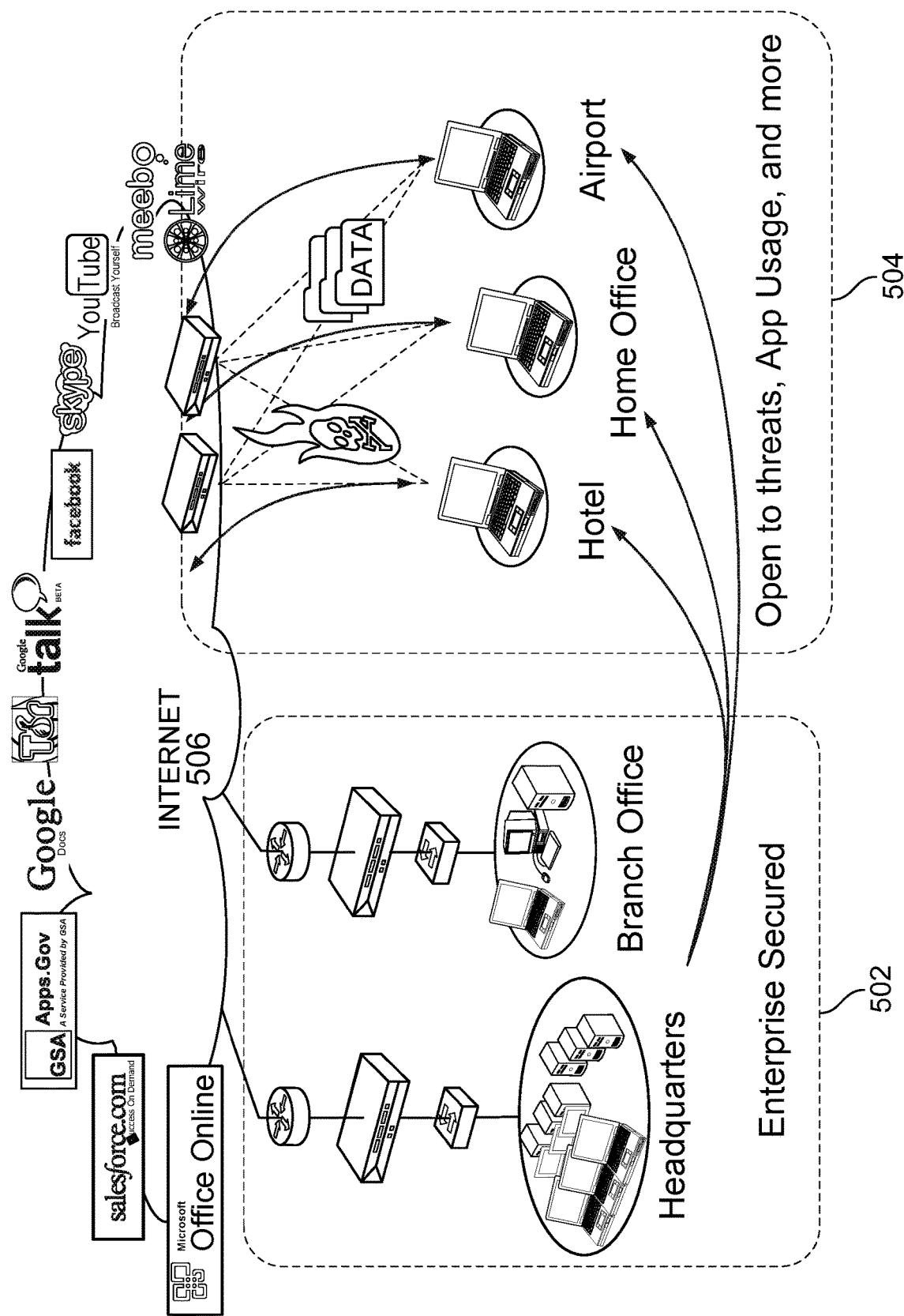
FIG. 5 is a block diagram illustrating a common architecture for policy enforcement for client devices outside of the secured enterprise network.

FIG. 5 is a block diagram illustrating a common architecture for policy enforcement for client devices outside of the secured enterprise network. Client devices can be located and are operating within an enterprise secured network environment 502. Client devices accessing the Internet 506 and various web sites or web services (e.g., Microsoft Office Online®, SalesForce.com®, Apps.gov, Google® search and/or services, Facebook®, Skype®, and various other online resources) available via the Internet do so through the security infrastructure of the enterprise security network, such as through the enterprise firewall/security appliance.

However, corporate and enterprise users are increasingly working remote (e.g., working from a home office and/or working while traveling). Generally, client devices accessing the Internet when the devices are not accessing the Internet through the enterprise secured environment are not as protected, as they are more open to various types of security threats. As shown at 504, client devices can access the Internet from a hotel, home office, airport, and/or other remote/outside of the enterprise secured environment. In this environment 504, the client devices can be exposed to downloading of malware and/or otherwise not as protected when using network based access, downloading content, and/or using network based services.

As a result, it is becoming increasingly important to ensure that client devices are fully protected when the client devices move off of the controlled network (e.g., are connecting to the Internet through a home or public network, not through the corporate/enterprise network). For example, when an employee works with their corporate laptop outside of the office, the corporate laptop should be protected even when the employee works from home, another office, or is traveling and connecting their laptop to various networks for Internet access.

Existing approaches do not adequately protect the client devices when they move off of the controlled network. Security software can be installed on the client device (e.g., point security products, such as antimalware software, USB port control, and/or other security software point products or security software suites). Cloud-based security services typically install a security agent on the client device. The security agent forces traffic to a cloud based proxy for scanning and policy enforcement. Traditional VPNs provide secure tunnels for securing communications between the client device and the corporate gateway. However, each of these approaches have various limitations, including, for example, security limitations/holes (e.g., silo oriented approaches, such as with point security products); expensive to purchase, deploy, and manage; degraded performance; policies are inconsistent with network security policies; and limited (if any) coordination between user, application, and content.

What is needed are improved techniques for protecting client devices, even when they move off of the controlled network. Accordingly, various techniques are described herein for protecting client devices even when they move off of the controlled network by using the above described firewall techniques using host information profiles in policies and collecting/receiving HIP reports from monitored client devices.

Figure 6:
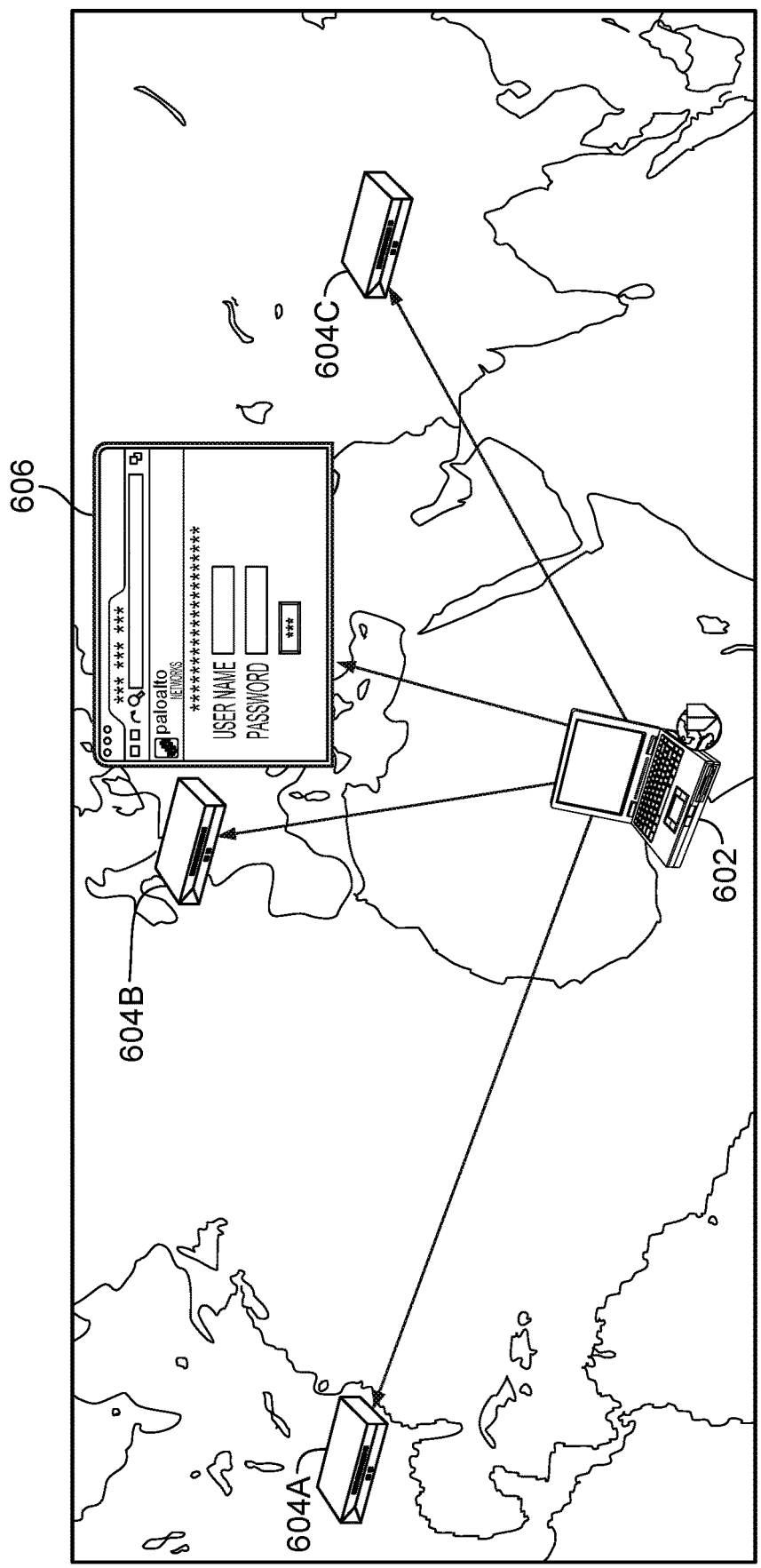
FIG. 6 is a block diagram illustrating another architecture for policy enforcement using host profile information in accordance with some embodiments.

FIG. 6 is a block diagram illustrating another architecture for policy enforcement using host profile information in accordance with some embodiments. In this architecture, client devices are protected even when they move off of the controlled network by using the above described firewall techniques, using HIP reports and host information profiles (e.g., HIP in policy). This approach provides for transparent policy enforcement for client devices, even when they move off of the controlled network to always protect the client device using the corporate firewall policy (e.g., with single sign-on (SSO) enabled, this approach can be transparent to the user). In addition, using the various HIP in policy related techniques described herein, policy enforcement can be based on the host health status. For example, the firewall policy can be enforced based on installed software and configuration of the client device (e.g., a client agent detects installed software packages and patches for HIP reporting, which can be used as client system profiles for policy enforcement). Moreover, this approach protects corporate resources. For example, access permission can be based on HIP reports and host information profiles to prevent corporate confidential information from being accessed by potentially insecure hosts (e.g., users of client devices can be permitted or denied access to corporate resources based on the client device's condition and existing client security state). As an example, a policy can require that users can only access a source code repository system from computers with an encrypted hard drive, in which the configured HIP object or configured HIP agent reports whether client devices have the corporate standard for disk encryption and that it is actually being used on the client device.

As shown in FIG. 6, client device 602 can connect to one of three enterprise gateways 604A, 604B, or 604C. In some embodiments, an enterprise network portal 606 is provided. In some embodiments, the portal 606 provides a central configuration repository for the enterprise client devices. In some embodiments, a client device agent executes on the client device (e.g., GlobalProtect software provided by Palo Alto Networks, Inc., which can be executed on, for example, a Microsoft Windows® OS) to establish and maintain a secure communication technique with a selected gateway (e.g., using SSL or IPsec to establish a secure tunnel between the client device with selected gateway 604A, 604B, or 604C) to force all outbound traffic to be inspected by the selected gateway (e.g., a security appliance or other security gateway device provided by the enterprise secured environment). In some embodiments, the client is automatically connected via a secure tunnel (e.g., VPN tunnel) to the enterprise network to force network traffic through the gateway (e.g., data/security appliance). In some embodiments, the secure gateway provides secure Internet services and policy enforcement, including policy enforcement using host information profiles, for enterprise client devices (e.g., different client configurations can follow different security policies).

For example, the client device can log into the portal and retrieve the latest configuration. From the configuration, it locates a preferred gateway (e.g., based on geography, work load, user group, device type, and/or other criteria) to connect to and establishes a secure tunnel to the gateway (e.g., using either SSL or IPsec). In some embodiments, distributed gateway deployment for optimized user network access performance is provided. For example, the gateway can be selected based on a shortest response time to a query. After the secure tunnel is established, the client device sends the client's HIP report or HIP check message to the gateway (e.g., periodically, at a specified interval specified in a configuration file, after HIP report information changes, and/or based on various other criteria). In some embodiments, all traffic to/from the client device is routed through the secure gateway. In some embodiments, the client outbound traffic will be forwarded to the gateway for security inspection before it is forwarded/sent to the Internet, thus allowing the gateway to filter out all unwanted traffic from and to the client device. In some embodiments, all traffic from the client is communicated (e.g., securely, using SSL or IPSEC tunnels) to the gateway for policy control and threat scanning, in which the policy control and threat scanning are performed using the HIP report for the client device.

Figure 7:
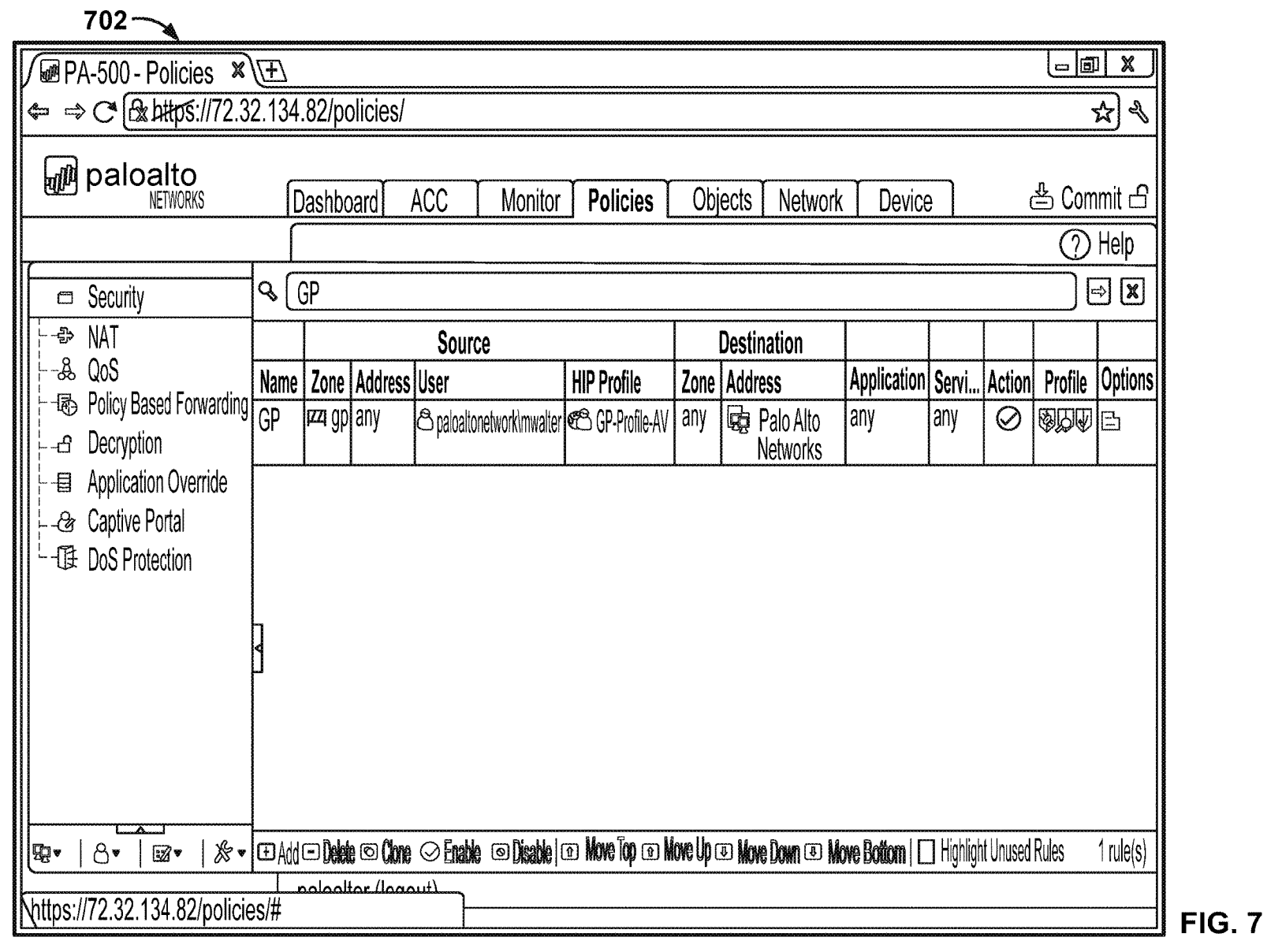

FIG. 7 is a screen shot illustrating a portal for policy enforcement using host profile information. As shown in the enterprise network portal screen shot 702, includes various tabs for different views are provided, such as a dashboard view, a monitor view, a policies view, an objects view (e.g., HIP objects), a network view, a device view, and various other views. The policies view is the shown view and selected tab, as shown in FIG. 7. The policies view shows policy information listed by policy name, including each policy's respective source information (e.g., zone, address, user, and HIP profile) and destination information (e.g., zone, application, service, and action). In some embodiments, an enterprise network portal provides a central configuration repository for the enterprise client devices. For example, a network administrator or security administrator can view/configure rules/policies using HIP profile information and/or other criteria/information (e.g., application and user) using the portal.

In some embodiments, customizable notifications are provided to inform a user of the client device about HIP checking results and potential policy implications. In some embodiments, applying a policy using a HIP profile can report which clients have disabled certain required or recommended remediation software (e.g., the remediation software was uninstalled or is not executing). In some embodiments, a security policy can be configured to quarantine such client devices, block traffic from such client devices, report such client devices to a network/security administrator, notify the user of the client device of the out of policy configuration of the client device, and/or perform other responsive actions.

FIG. 8 is a host information profile (HIP) report example in which antivirus software is not installed on a client in accordance with some embodiments. In some embodiments, a HIP report is an XML formatted file. In some embodiments, HIP reports are securely communicated from a client to a gateway using secure connection (e.g., SSL or IPSEC) between the client and the gateway. In some embodiments, a HIP profile is used in a security policy (e.g., different profiles can be used for different rules, such as whether certain security software is installed, up to date, and currently executing with certain features, such as auto protect enabled). For example, a HIP report without AV enabled can have an antivirus information block in XML, such as shown below and as similarly shown in FIG. 8.

```
<entry name="antivirus"> <list/>
</entry>
```

FIG. 9 is a host information profile report example in which antivirus software is installed and enabled on a client in accordance with some embodiments. For example, a HIP report with AV enabled can have an antivirus information block in XML, such as shown below and as similarly shown in FIG. 9. As shown in the below example and in FIG. 9, the AV information block in the HIP report can include a list of installed antivirus software, version information for the installed antivirus software, signature/data file version/date information for the installed antivirus software, vendor information for the installed antivirus software, setting information for the installed antivirus software, such as whether or not real-time protection/auto protection is enabled, and status information for the installed antivirus software, such as the date/time of a last full antivirus scan performed by the installed antivirus software.

```
<list>
<entry>
<ProductInfo> <Prod name="Symantec AntiVirus" version="10.1.7.7000" defver="3/4/2011 rev. 2"
prodType="1" engver="101.3.0.93" osType="1" vendor="Symantec Corp." dateday="4"
dateyear="2011" datemon="3"> </Prod>
<realtime-protection>yes</real-time-protection>
last-full-scan-time>n/a</last-full-scan-time> </ProductInfo>
</entry>
</list>
</entry>
```

Figure 10:
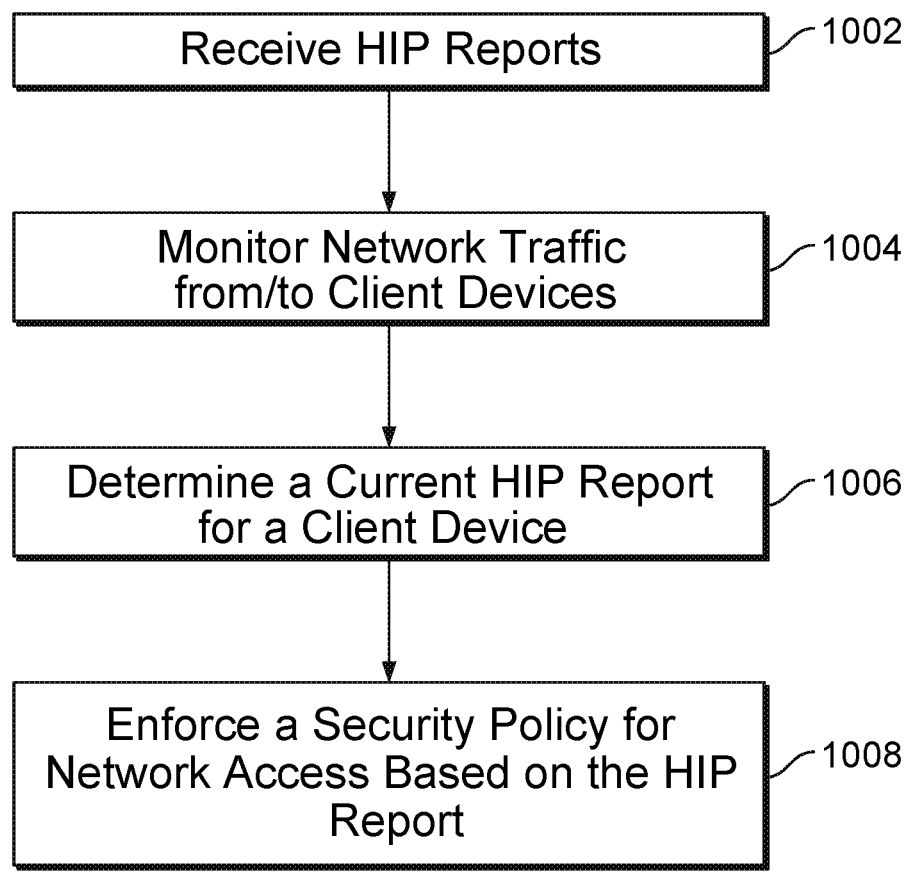
FIG. 10 is a flow diagram for policy enforcement using host profile information in accordance with some embodiments.

FIG. 10 is a flow diagram for policy enforcement using host profile information in accordance with some embodiments. At 1002, HIP reports are received. At 1004, network traffic is monitored to/from client devices. At 1006, a current HIP report for a client device is determined. At 1008, a security policy is enforced for network access for the client device based on the HIP report for the client device (e.g., matching one or more host information profiles).

Figure 11:
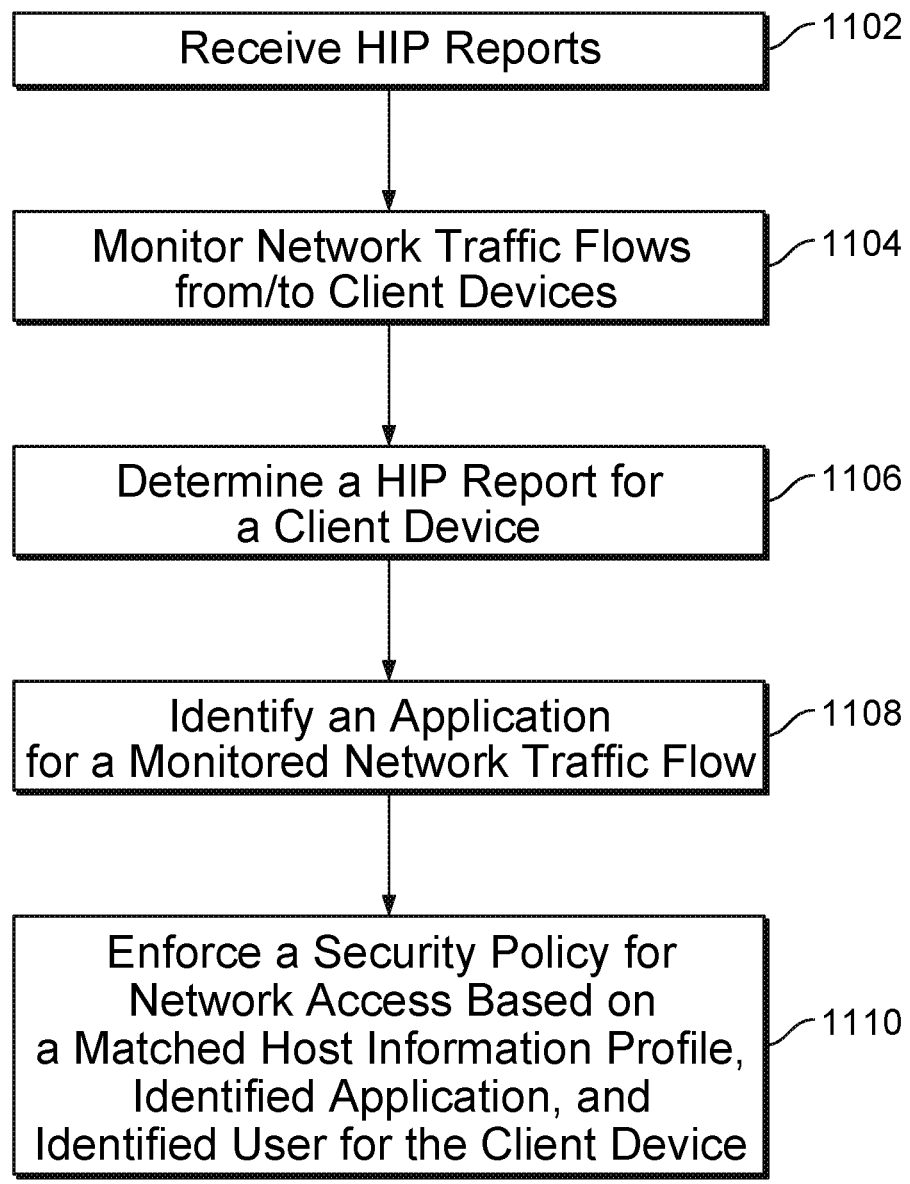
FIG. 11 is another flow diagram for policy enforcement using host profile information in accordance with some embodiments.

FIG. 11 is another flow diagram for policy enforcement using host profile information in accordance with some embodiments. At 1102, HIP reports are received. At 1104, network traffic flows are monitored to/from client devices. At 1106, a HIP report for a client device is determined. At 1108, an application is identified for the monitored network traffic flow. At 1110, a security policy is enforced for network access for the client device based on the HIP report for the client device that matches the host information profile report, identified application, and identified user (e.g., user name/group) for the client device.

Figure 12:
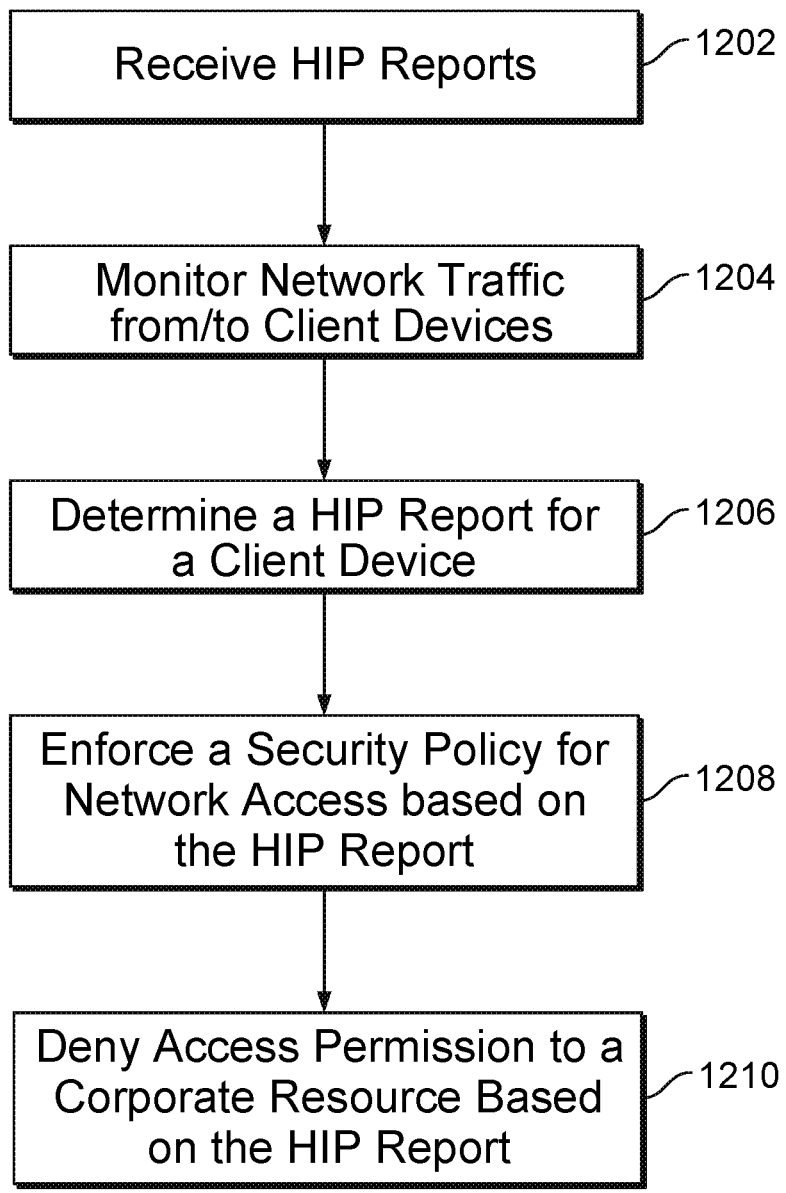
FIG. 12 is another flow diagram for policy enforcement using host profile information in accordance with some embodiments.

FIG. 12 is another flow diagram for policy enforcement using host profile information in accordance with some embodiments. At 1202, HIP reports are received. At 1204, network traffic is monitored to/from client devices. At 1206, a HIP report for a client device is determined. At 1208, a security policy is enforced for network access based on the HIP report (e.g., matching one or more host information profiles). At 1210, access permission is denied to a corporate resource based on the HIP report (e.g., matching one or more host information profiles).

Figure 13:
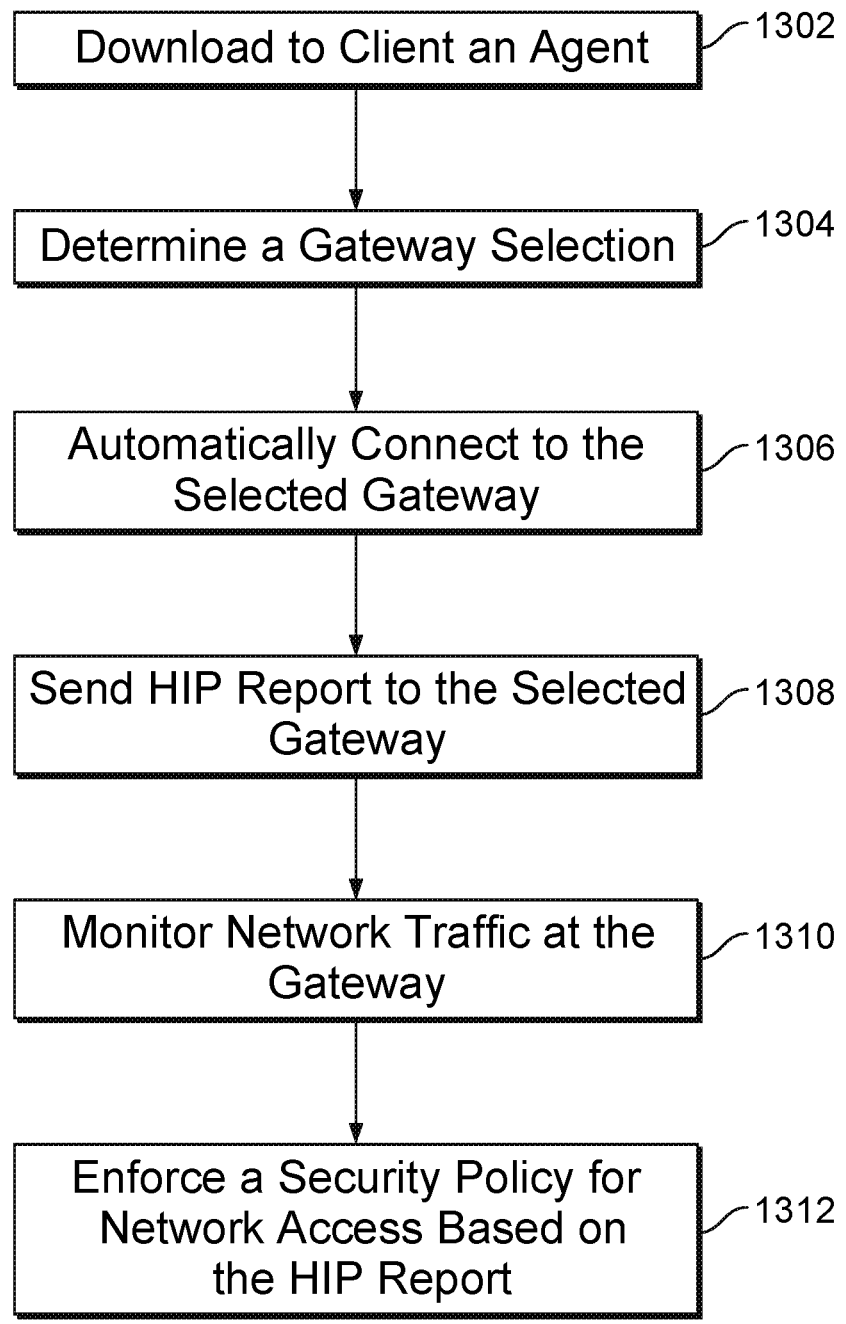
FIG. 13 is another flow diagram for policy enforcement using host profile information in accordance with some embodiments.

FIG. 13 is another flow diagram for policy enforcement using host profile information in accordance with some embodiments. At 1302, an agent (e.g., a software agent that executes on the client) is downloaded to the client. In some embodiments, the agent performs HIP reporting as described herein with respect to various embodiments. In some embodiments, the agent also performs an automatic secure connection to an enterprise gateway as described herein with respect to various embodiments. In some embodiments, these functions are performed by two separate agents, such as a HIP reporting agent and an enterprise gateway connect agent. In some embodiments, the agent authenticates the user, downloads the latest configuration information, and checks the client device for client updates. At 1304, the agent determines a gateway selection for a network connection for the client. In some embodiments, the agent performs an enterprise gateway selection using the various techniques described herein with respect to various embodiments. For example, the agent can contact all enterprise gateways and select the gateway with the lowest response time. In some embodiments, the agent is configured to attempt to connect to predetermined enterprise gateways based on availability and using a prioritized attempt sequence. At 1306, the agent automatically connects the client device to the selected gateway agent using a secure connection. In some embodiments, the agent establishes a secure tunnel connection with the selected gateway and sets a default route to the tunneling interface. In some embodiments, the agent will maintain the secure tunnel connection with the gateway and automatically re-establish the secure tunnel connection, if needed (e.g., which may or may not be with the same previously selected gateway, such as if the previously selected gateway becomes unavailable or too busy). At 1306, the client sends the HIP report for the client to the selected gateway. At 1310, network traffic is monitored to/from the client device at the gateway to which the client device is connected (e.g., using a secure tunnel connection between the client device and the gateway). At 1312, a security policy is enforced at the gateway for network access for the client based on the host information profile report for the client (e.g., matching one or more host information profiles).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a client device configured to:
        send queries to a plurality of gateways;
        receive responses from the plurality of gateways; and
        select a gateway from the plurality of gateways to send network traffic based on a) a response time for receiving a response, availability, and using a prioritized attempt sequence, and b) geography, work load, user group, device type, or any combination thereof from a plurality of gateways, the selected gateway for communication with an enterprise network; and
    a processor of the selected gateway of the plurality of gateways configured to:
        receive a host profile from a client device, wherein the host profile includes device profile information associated with the client device;
        determine a user name logged into the client device, wherein the user name is associated with an Internet Protocol (IP) address of the client device;
        identify an application generating network traffic from the client device, wherein the application is associated with the network traffic, and wherein the network traffic involves Hypertext Transfer Protocol (HTTP) traffic, File Transfer Protocol (FTP) traffic, a Domain Name System (DNS) request, unknown traffic, or any combination thereof; and
        enforce a security policy for network access at the selected gateway based on the determined user name, the identified application, and the host profile, wherein the security policy includes a firewall rule, wherein the enforcing of the security policy for network access comprises to:
            determine that the host profile matches a first host profile or a second host profile, wherein the host profile includes a) device hardware information including a type of device, a general processor, and a network processor, b) device software information including three or more of the following: an operating system identifier, an operating system patch level, a security application, security data file level, and date of last scan performed by the security application, and c) the device software information including remediation information and information identifying a plurality of applications executing on the client device, and wherein the first host profile is different from the second host profile, wherein in the event that the host profile matches the first host profile, a first security policy is selected to be the security policy, wherein the first host profile is different from the second host profile, wherein in the event that the host profile matches the second host profile, a second security policy is selected to be the security policy; and
            enforce the selected security policy; and
    a memory coupled to the processor and configured to provide the processor with instructions.

2. The system recited in claim 1, wherein the security policy includes an inbound firewall rule and an outbound firewall rule.

3. The system recited in claim 1, wherein the security policy includes a network access rule.

4. The system recited in claim 1, wherein the system includes a security appliance.

5. The system recited in claim 1, wherein the host profile includes device software information, wherein the device software information includes an operating system identifier, an operating system patch level, a security application, and security data file level.

6. The system recited in claim 1, wherein the host profile includes device location information, wherein the device location information includes information for identifying whether the client device is in a trusted zone or an untrusted zone.

7. The system recited in claim 1, wherein the host profile includes device authorization information, wherein the device authorization information includes information for identifying whether the client device is authorized for access to a corporate network.

8. The system recited in claim 1, wherein the host profile is generated by an agent executed on the client device, and wherein the host profile is periodically reported from the client device.

9. The system recited in claim 1, wherein the memory is further configured to provide the processor with instructions which when executed cause the processor to:
    receive host profiles from each of a plurality of client devices.

10. The system recited in claim 1, wherein the memory is further configured to provide the processor with instructions which when executed cause the processor to:
    deny access permission to a corporate resource based on a host information profile that matches the host profile, wherein the host profile indicates that the client device is a potentially insecure host.

11. A method, comprising:
sending queries to a plurality of gateways;
receiving responses from the plurality of gateways;
selecting a gateway from the plurality of gateways to send network traffic based on a) a response time for receiving a response, availability, and using a prioritized attempt sequence, and b) geography, work load, user group, device type, or any combination thereof from a plurality of gateways, the selected gateway for communication with an enterprise network;
receiving a host profile from a client device, wherein the host profile includes device profile information associated with the client device;
determining a user name logged into the client device, wherein the user name is associated with an Internet Protocol (IP) address of the client device;
identifying an application generating network traffic from the client device, wherein the application is associated with the network traffic, and wherein the network traffic involves Hypertext Transfer Protocol (HTTP) traffic, File Transfer Protocol (FTP) traffic, a Domain Name System (DNS) request, unknown traffic, or any combination thereof; and
enforcing, using a processor of the selected gateway of the plurality of gateways, a security policy for network access at the selected gateway based on the determined user name, the identified application, and the host profile, wherein the security policy includes a firewall wherein the enforcing of the security policy for network access comprises:
  determining that the host profile matches a first host profile or a second host profile, wherein the host profile includes a) device hardware information including a type of device, a general processor, and a network processor, b) device software information including three or more of the following: an operating system identifier, an operating system patch level, a security application, security data file level, and date of last scan performed by the security application, and c) the device software information including remediation information and information identifying a plurality of applications executing on the client device, and wherein the first host profile is different from the second host profile, wherein in the event that the host profile matches the first host profile, a first security policy is selected to be the security policy, wherein the first host profile is different from the second host profile, wherein in the event that the host profile matches the second host profile, a second security policy is selected to be the security policy; and
  enforcing the selected security policy.

12. A computer program product, the computer program product being embodied in a non-transitory computer readable storage medium and comprising computer instructions for:
sending queries to a plurality of gateways;
receiving responses from the plurality of gateways;
selecting a gateway from the plurality of gateways to send network traffic based on a) a response time for receiving a response, availability, and using a prioritized attempt sequence, and b) geography, work load, user group, device type, or any combination thereof from a plurality of gateways, the selected gateway for communication with an enterprise network;
receiving a host profile from a client device, wherein the host profile includes device profile information associated with the client device;
determining a user name logged into the client device, wherein the user name is associated with an Internet Protocol (IP) address of the client device;
identifying an application generating network traffic from the client device, wherein the application is associated with the network traffic, and wherein the network traffic involves Hypertext Transfer Protocol (HTTP) traffic, File Transfer Protocol (FTP) traffic, a Domain Name System (DNS) request, unknown traffic, or any combination thereof; and
enforcing a security policy for network access at the selected gateway based on the host profile, wherein the security policy includes a firewall wherein the enforcing of the security policy for network access comprises:
  determining that the host profile matches a first host profile or a second host profile, wherein the host profile includes a) device hardware information including a type of device, a general processor, and a network processor, b) device software information including three or more of the following: an operating system identifier, an operating system patch level, a security application, security data file level, and date of last scan performed by the security application, and c) the device software information including remediation information and information identifying a plurality of applications executing on the client device, and wherein the first host profile is different from the second host profile, wherein in the event that the host profile matches the first host profile, a first security policy is selected to be the security policy, wherein the first host profile is different from the second host profile, wherein in the event that the host profile matches the second host profile, a second security policy is selected to be the security policy; and
  enforcing the selected security policy.

* * * * *